United States Patent [19]

Bott

[11] 4,277,009
[45] Jul. 7, 1981

[54] PERMANENT LUGGAGE CARRIER ADAPTERS WITH REMOVABLE PRIMARY LUGGAGE CARRIERS

[76] Inventor: John A. Bott, 931 Lakeshore Dr., Grosse Pointe Shores, Mich. 48236

[21] Appl. No.: 39,391

[22] Filed: May 15, 1979

[51] Int. Cl.³ .............................................. B60R 9/10
[52] U.S. Cl. .................................... 224/309; 224/321; 224/325
[58] Field of Search ............... 224/309, 321, 322, 324, 224/325, 326, 330, 314, 42.4, 319; 248/346

[56] References Cited

U.S. PATENT DOCUMENTS

| 3,223,302 | 12/1965 | Helm | 224/319 |
|---|---|---|---|
| 3,253,755 | 5/1966 | Bott | 224/321 |
| 3,325,067 | 6/1967 | Helm | 224/325 |
| 3,519,180 | 7/1970 | Bott | 224/321 |
| 3,719,313 | 3/1973 | Tischler | 224/309 |
| 3,724,730 | 4/1973 | Olsen et al. | 224/309 |

Primary Examiner—Steven M. Pollard
Attorney, Agent, or Firm—Harness, Dickey & Pierce

[57] ABSTRACT

An automobile luggage carrier having a plurality, preferably for mounting receptacles permanently attached to the roof of the automobile to which other different types of primary luggage carriers may be selectively attached. For example, heavy-load utility bar assemblies may be attached to carry heavy loads, such as a boat, crate or large box; or standard luggage carrier assemblies may be attached to carry lighter and less bulky loads, such as travel cases, smaller boxes and the like.

9 Claims, 7 Drawing Figures

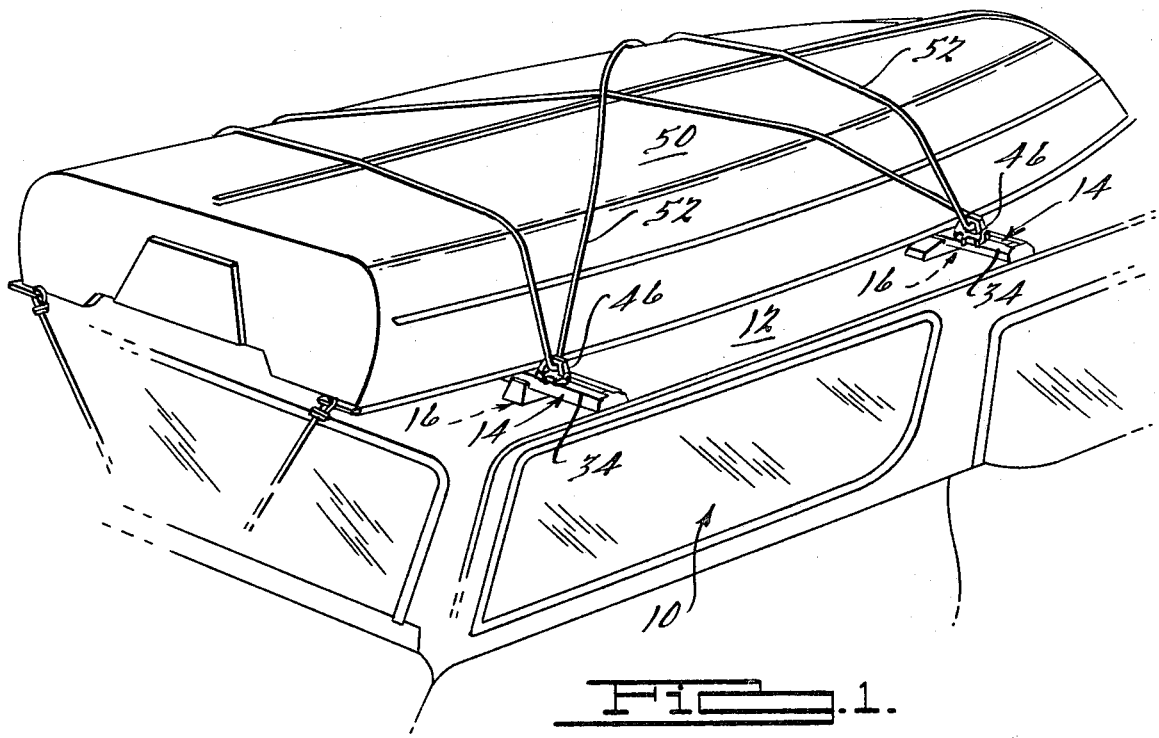
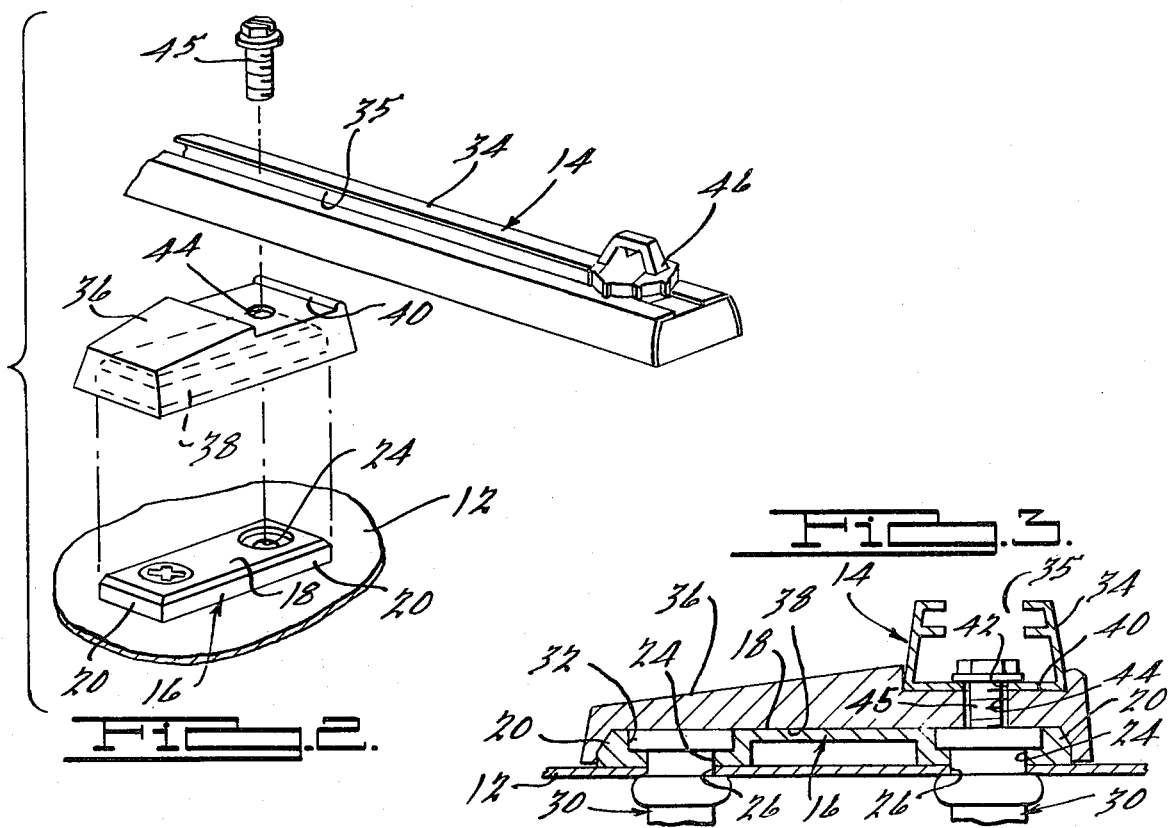

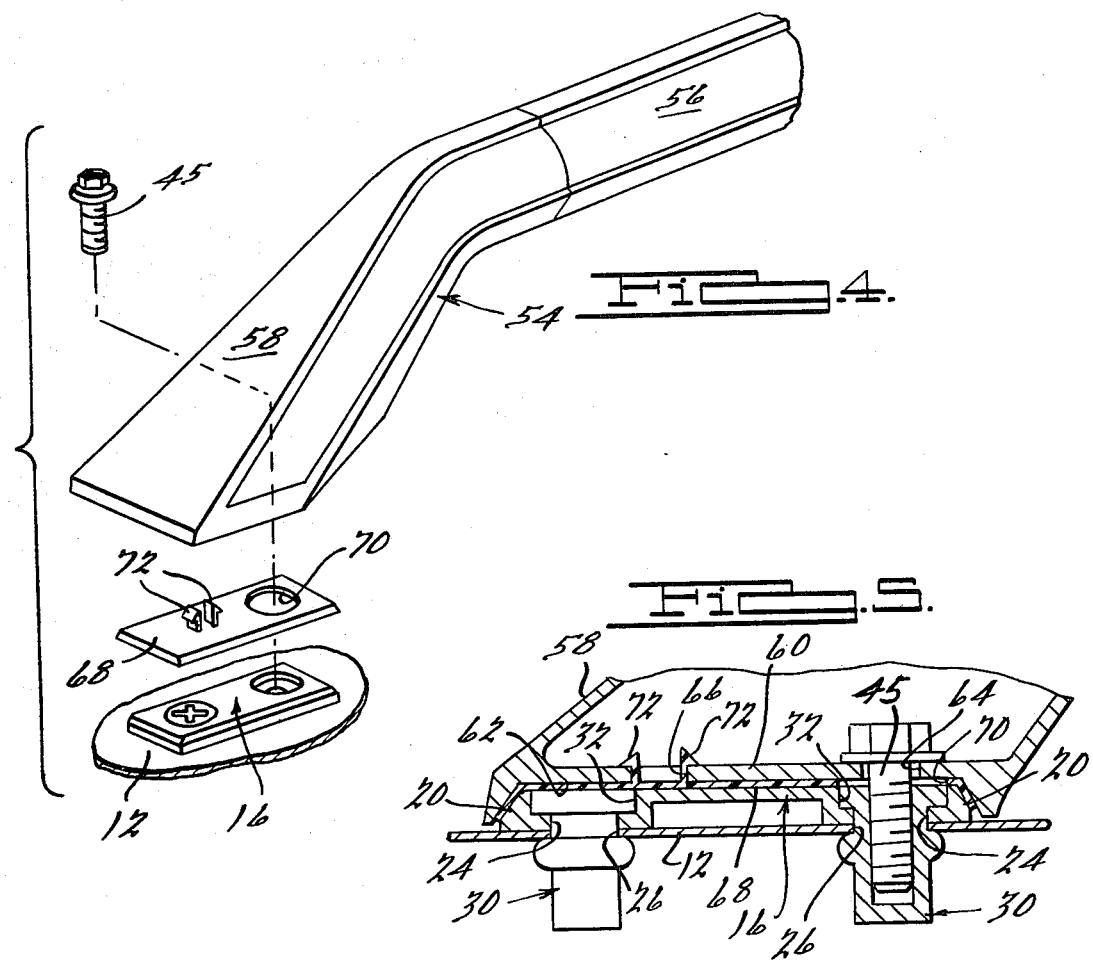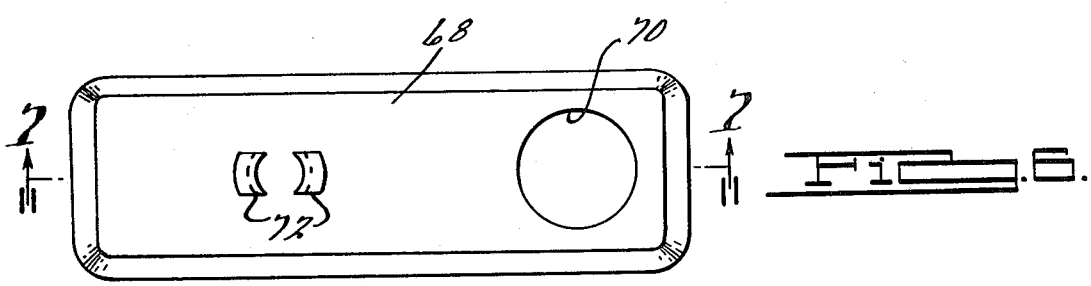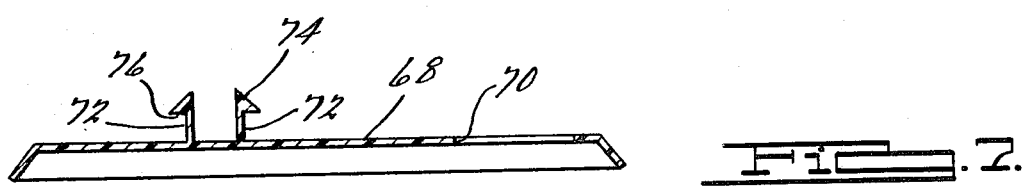

PERMANENT LUGGAGE CARRIER ADAPTERS WITH REMOVABLE PRIMARY LUGGAGE CARRIERS

BACKGROUND OF THE INVENTION

Luggage carriers or racks have long been used on outer surfaces of automotive vehicles for carrying different types of articles, such as bulky boats, crates or large boxes, or a plurality of smaller articles such as travel cases, smaller boxes and the like. This has meant a different kind of attachment to the vehicle for each of these separate uses.

A known luggage carrier for large bulky objects is disclosed in Bott U.S. Pat. No. 4,055,284, granted Oct. 25, 1977.

A known luggage carrier assembly for travel cases and smaller objects is disclosed in Bott U.S. Pat. No. 3,519,180, granted July 7, 1976.

SUMMARY OF THE INVENTION

According to the present invention special means in the form of a plurality of mounting receptacles are permanently attached to the horizontal roof of an automotive vehicle. As illustrated in the examples disclosed there are four of such receptacles mounted adjacent the corner areas of the vehicle top. These receptacles are thus available at all times to accommodate a selected primary type of luggage carrier. A pair of aluminium heavy load utility bars may be mounted transversely of the top adjacent the front and rear of the top with the ends of the utility bars secured to the receptacles through spacer block adapters. Tie-down loops are disposed on the utility bars and a boat, crate or box lashed thereto by roping.

To convert the carrier to other uses is a simple matter since the mounting receptacles are permanent attachments to the vehicle top and all that is necessary is to remove utility bars and spacer blocks and substitute a conventional luggage carrier assembly.

The mounting receptacles are preferably attached to the vehicle top by closed-end, blind fasteners having preformed internal threads which perform, in effect, as anchor nuts for the reception of studs to removably attach the utility bars and spacer blocks, or the stanchions of more conventional luggage carriers.

Thus, this invention provides a simple conversion from one type of carrier to another and lends itself to a variety of options.

BRIEF DESCRIPTION OF THE DRAWINGS

FIG. 1 is a fragmentary perspective view of an automobile having an article carrier of one type removably attached thereto through permanent adapters according to the present invention.

FIG. 2 is a separated perspective view of the permanent attachment means in relationship to the cooperating parts of the primary luggage carrier of the type illustrated in FIG. 1.

FIG. 3 is a cross-sectional view of the assembled parts shown in FIG. 2.

FIG. 4 is a partial, separated perspective view of the present invention illustrating the parts of another form of a primary luggage carrier attached to the vehicle roof surface.

FIG. 5 is a cross-sectional view of the assembled parts shown in FIG. 4.

FIG. 6 is a plan view of one of the elements, namely, the supplemental pad, shown in FIGS. 4 and 5.

FIG. 7 is a cross-sectional view taken substantially along the line 7—7 of FIG. 6.

DETAILED DESCRIPTION OF THE ILLUSTRATED EMBODIMENTS OF THE INVENTION

Referring to FIGS. 1 through 3, one embodiment of the invention is illustrated for removably supporting a removable primary luggage carrier of the type employed to carry large bulky articles such as a boat.

A portion of an automotive vehicle is generally indicated at 10 which includes a top surface 12 to which a primary article or luggage carrier 14 is removably mounted.

The carrier 14 is connected to the roof 12 through four receptacle members 16 which are permanently attached to the roof 12 at the four-corner areas of the roof, there being one pair of receptacles 16 adjacent the forward area of the roof and the other pair adjacent the rear area of the roof.

The receptacles or mounting members 16 are generally rectangular in form with a flat top 18 and depending side walls 20.

Each receptacle 16 has a pair of spaced openings 24 adapted to be positioned over underlying openings 26, respectively, in the roof 12. Each opening 24 is formed with a countersink 32 in its top surface and fasteners 30 are received in and through the aligned openings 24 and 26 to permanently secure each receptacle 16 to its proper position on the roof in one of the four-corner areas.

The fasteners 30 are preferably of the type known in the fastener art as one-piece metal blind rivets with internal threads that act as anchor nuts. The preferred one is the closed end type so as to prevent water from entering the body under the roof. When placed in holes 24 and 26 the threaded section of the rivet is pulled by a threaded stud, while the head is held by the tool anvil and the shank on the blind side is caused to expand at the center section to lock the rivet in place and permanently secure the receptacles 16 to the roof 12.

Such blind fasteners 30 have been known for years and are readily available under the tradename RIV-NUTS. Their use has particular utility in the combination here disclosed.

The openings 24 terminate in countersinks 32 adjacent the tops so that the tops of the fasteners 30 are confined in the countersink of the receptacles 16.

In the embodiment of FIGS. 1 through 3, the primary article or luggage carrier 14 comprises a pair of transverse, heavy load utility bars 34. Such bars 34 may be of substantially the same cross-sectional configuration as the cross bars 40 in the co-pending application of J. A. Bott, Ser. No. 9,608, filed Feb. 5, 1979, in that they are in the shape of upwardly opening channels. There is one of such bars 34 disposed across the top 12 adjacent the forward and rear areas of the roof overlying the corresponding pairs of receptacles 16.

The ends of the bars 34 are each connected to the underlying receptacle 16 by an interposed spacer block 36. The blocks 36 are formed with an undersurface recess 38 complementary in shape to the peripheral shape of the receptacles which project above the surface of the roof.

The blocks 36 are each formed with a transverse slot 40 in the top which is adapted to receive the adjacent end of the bar 34. Aligned openings 42 and 44 are formed in the bar 34 and the block 36, respectively. A stud 45 is passed through the openings 42 and 44 and is threaded into the internally threaded shrank of the fastener 30 to secure the bars 34 to their respective blocks 36.

Tie-downs studs 46 are disposed adjacent the ends of the bars 34 and are adjustably positioned thereon similar to the way corresponding tie-down studs 32 are mounted on thier bars 40 in the co-pending application of Bott above identified.

In this embodiment a large boat 50 is mounted on the cross bars 34 and lashed thereto by a rope 52 which is secured through the openings in the tie-downs at the four-corner areas in the usual way.

Referring to FIGS. 4 through 7, a different form of luggage carrier 54 is mounted on the receptacles 16. Such carrier 54 may generally be of the type shown in Bott U.S. Pat. No. 3,519,180 above referred to. Such carrier 54 includes longitudinally extending side rails 56, at each side, terminating in stanchions 58.

The base 60 of each stanchion is formed with a recess 62 complementary in shape to the exterior configuration of the receptacle 16 to receive the receptacle therein. Each base 60 is provided with spaced openings 64 and 66 therein.

A molded support pad 68, preferably of high density polyethylene, is disposed between the top of receptacle 16 and the undersurface of the stanchion base 60 and has a complementary configuration to both. The pad 68 has an opening 70 aligned with openings 64 and 24. The pad 68 is also formed with upwardly directed integral and resilient fingers 72, the upper ends of which terminate in beveled outer sides 74 with horizontal under edges 76. The fingers 72 are aligned with the opening 66 in the stanchion base so that in the assembly the fingers are snapped through the openings 66 to position the stanchions on the receptacles 16.

A stud 45 is passed through the openings 64 and 70 and the threaded into the internal threaded shank of the fastener 30 to secure the stanchions 58 of the primary carrier 54 to the receptacles 16 and to the vehicle roof.

Thus with the receptacle 16 permanently attached to the roof 12 the operator may selectively attach a different type of carrier, for example, either that type shown in FIGS. 1 through 3, or that other type shown in FIGS. 4 through 7.

It will be apparent to those skilled in the art that still other forms of primary carriers may be adapted for mounting on the permanent receptacles 16 within the teaching of this disclosure and invention.

Formal changes may be made in the embodiments specifically illustrated without departing from the spirit and substance of the invention, the scope of which is set forth in the appended claims.

I claim:

1. A luggage carrier mounted on a substantially horizontal surface of an automotive vehicle, said carrier comprising a plurality of four combination mounting and positioning elements disposed over said surface in four-corner areas thereof and permanently attached thereto, each of said elements being of a polygonal configuration and projecting above said surface and including a pair of openings for the reception of a pair of blind fasteners, first fastening means securing each of said elements to one of each of said pair of blind fasteners associated therewith a luggage carrier system comprising four support members disposed one above each of said elements, each of said support members having an opening therein and a lower end portion, the underside of which is formed with a recess which is slightly larger than and of a generally complementary shape with respect to the shape of said elements so that when said support members are surmounted on said elements, said elements are substantially nestingly received within the recesses of said support members so that said support members are properly oriented upon the associated vehicle and so that said opening in each said support member is aligned with the other of said pair of blind fasteners associated with each of said elements, whereby cooperating second fastening means may extend through said openings in said supporting members and into said other of said pair of blind fasteners associated with each of said elements to removably secure said support members of said luggage carrier system to said vehicle.

2. A load carrying system for use in conjunction with a substantially horizontal surface of an automotive vehicle, said system comprising a plurality of combination mounting and positioning elements spaced over said surface and permanently attached thereto, each of said plurality of elements being of a polygonal configuration projecting above said surface and including at least one opening for the reception of attaching means for permanently attaching the element to said surface, a first primary load carrier including a first load bearing structure and a plurality of first supporting means disposed one above each of said elements, each of said first supporting means having an opening therein and a lower end portion, the underside of which is formed with a recess which is slightly larger than and of a generally complementary shape with respect to the shape of said elements so that when said first supporting means are surmounted on said elements, said elements are substantially nestingly received within the recesses of said first supporting means so that said first supporting means are properly oriented upon the associated vehicle and so that said openings in said first supporting means are aligned with the attaching means associated with each of said elements, whereby first fastening means may extend through said openings and cooperate with the attaching means associated with each of said elements for removably securing said first primary load carrier to said plurality of elements, and a second primary load carrier including a second load bearing structure and a plurality of second supporting means disposed one above each of said elements, each of said second supporting means having an opening therein and a lower end portion, the underside of which is formed with a recess which is slightly larger than and of a generally complementary shape with respect to the shape of said elements so that when said second supporting means are surmounted on said elements, said elements are substantially nestingly received within the recesses of said second supporting means so that said second supporting means are properly oriented upon the associated vehicle and so that said openings in said second supporting means are aligned with the attaching means associated with each of said elements, whereby second fastening means may extend through said openings and cooperate with the attaching means associated with each of said elements for removably securing said second primary load carrier to said plurality of elements, said first and second primary load carriers comprising interchangeable load carrying elements which are selectively attachable to said plurality of elements and removable therefrom.

3. A load carrying system as set forth in claim 2 wherein said attaching means comprise blind fasteners having heads flush with the outer surface of said elements and pre-formed threads in the inwardly projecting tubular portions of said blind fasteners which cooperate with said first fastening means to removably secure said first primary load carrier to said elements and with said second fastening means to removably secure said second primary load carrier to said elements.

4. A load carrying system as set forth in claim 3 wherein said blind fasteners have closed inner ends to prevent liquids from entering the vehicle therethrough.

5. A load carrying system as set forth in claim 3 wherein four of said elements are disposed in the four corner areas of said surface and project above said surface.

6. A load carrying system as set forth in claim 5 wherein said first load bearing structure comprises two elongated utility bars, each said utility bar extending transversely between an opposed pair of said elements for supporting a load, and each of said plurality of first supporting means comprises a spacer block having a recess in its undersurface to receive an adjacent element therein and a transverse recess formed in its top surface for receiving an end of a utility bar therein, and said first fastening means comprises threaded fasteners which cooperate with said tubular portions of said blind fasteners to removably secure the ends of each said utility bar and said spacer blocks to an opposed pair of said elements.

7. A load carrying system as set forth in claim 5 wherein said second load bearing structure comprises two longitudinally extending confining elements, each said confining element defining an elevated rail member extending between an opposed pair of said elements, an each of said plurality of second supporting means comprises a stanchion at an end of each said rail member, each said stanchion being disposed above a element and having a recess in its undersurface to receive an adjacent element therein, and said second fastening means comprises threaded fasteners which cooperate with said tubular portions of said blind fasteners to removably secure each said stanchion to an adjacent element.

8. A load carrying system as set forth in claim 7 wherein each of said plurality of second supporting means further comprises a mounting pad complementary in shape to the top of each said element and to the recess in the undersurface of each said stanchion which is interposed therebetween.

9. A load carrying system a set forth in claim 2 wherein four of said elements are disposed in the four corner areas of said surface.

* * * * *